Nov. 4, 1952    J. E. CHAMBERS ET AL    2,616,121
INSULATED HANDLE
Filed Feb. 26, 1949
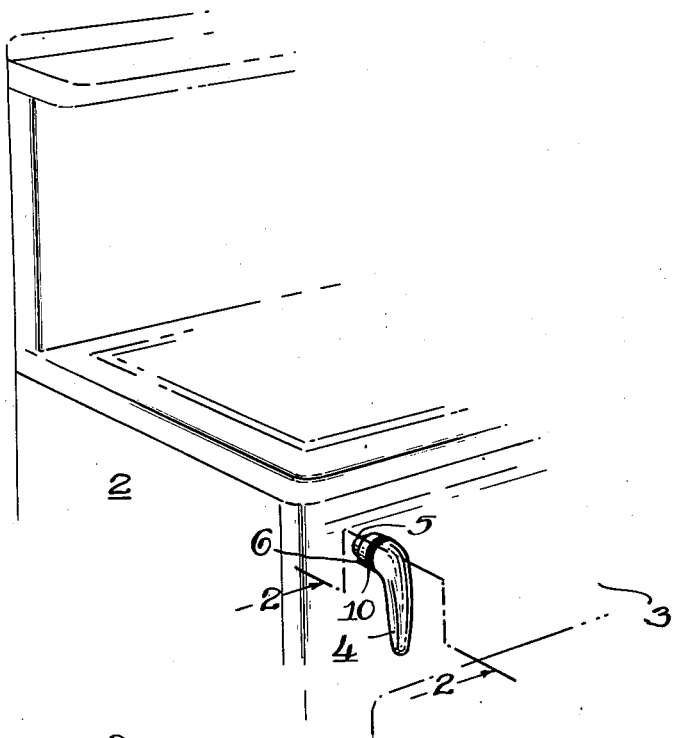
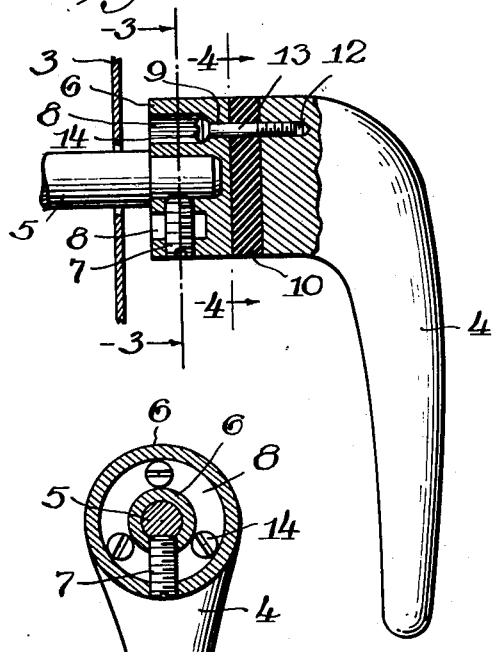
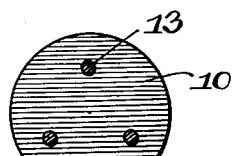
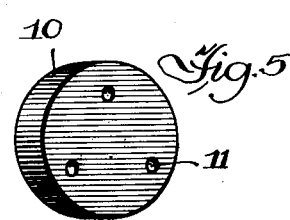
Inventors,
John E. Chambers
and Thomas Esta Phares.
By Schneider & Dressler, Attys.

Patented Nov. 4, 1952

2,616,121

UNITED STATES PATENT OFFICE 2,616,121

INSULATED HANDLE

John E. Chambers and Thomas Esta Phares, Shelbyville, Ind., assignors to Chambers Corporation, a corporation of Indiana Application February 26, 1949, Serial No. 78,606

1 Claim. (Cl. 16—116)

This invention relates to insulated handles. In particular, the invention relates to the insulation of metallic handles positioned adjacent hot parts of a cooking stove.

In gas cooking stoves, such as disclosed in the patent to Phares No. 2,339,422, issued January 18, 1944, a combination broiler and griddle is provided as part of the stove construction and a handle projecting through the front wall of the stove is provided to manipulate the broiler-griddle combination. This handle gets uncomfortably hot to the touch when the broiler is being heated and it is within the contemplation of the present invention to insulate handles of this type so effectively as to keep them cool enough to manipulate at any time, without affecting either their appearance or operation.

Although the present invention is concerned primarily with the insulation of the handle for adjusting the broiler height and tilting the griddle in a stove of the type mentioned above, it may also be used advantageously with any cooking stove or with a handle on any object that is subject to such heat as to transmit excessive heat to the handle. Insulated handles constructed in accordance with the present invention may be applied to new stoves, or may be substituted, with no appreciable difficulty, for conventional handles on stoves already in service.

The structure by which the above advantages are attained will be described in detail in the following description, taken in conjunction with the accompanying drawing in which:

Figure 1 is a fragmentary perspective view of a gas cooking stove with a handle projecting from the front;

Fig. 2 is a cross sectional view taken along the line 2—2 of Fig. 1;

Fig. 3 is a cross sectional view taken along the line 3—3 of Fig. 2;

Fig. 4 is a cross sectional view taken along the line 4—4 of Fig. 2; and

Fig. 5 is a detail perspective view of the insulating washer.

In the drawings, the reference numeral 2 indicates a cooking stove having a front wall 3. The handle constituting the subject matter of the present invention is made of metal, preferably plated, and comprises a grasping portion 4 positioned adjacent the front wall. Grasping portion 4 of the handle provides means for rotating a shaft 5 which projects through the front wall.

The handle has a collar portion 6 into which rotatable shaft 5 is rigidly secured in any suitable manner, as by a set screw 7. The end of the collar portion adjacent the front of the stove is provided with an annular recess 8 of substantial width, which extends a substantial distance into the collar. A plurality of apertures 9 extend from the bottom of the recess through the opposite end of the collar. The apertures are preferably spaced equidistantly around the circumference of recess 8. An insulating disk 10, preferably in the form of a fiber gasket or washer is provided with a plurality of apertures 11 which are spaced to correspond with the spacing of apertures 9. When the handle is assembled, disk 10 is positioned adjacent collar 6 with apertures 11 in alignment with apertures 9.

The end of grasping portion 4 of the handle is positioned flush with the front of insulating disk 10 and is provided with a plurality of recesses 12 aligned with apertures 9 and 11. Recesses 12 are threaded to receive screws 13 which are projected through apertures 9 and 11. The diameter of apertures 9 is less than the width of recess 8 so that the head 14 of the screws can fit in the recess and abut the bottom of the recess adjacent aperture 9. As screws 13 are threaded into recesses 12 and tightened against the bottom of recess 8 they hold the collar, insulating disk, and the front portion of the handle together firmly as a unit. The screws are entirely concealed from view and therefore do not detract from the appearance of the assembled handle.

Recess 8 is open to the atmosphere so that heat radiating from the surfaces of collar 6 formed by this recess will be dissipated to the surrounding atmosphere. The provision of this recess in the collar not only provides a desirable means for securing together the component parts of the handle but reduces the mass of the collar and greatly increases the surfaces thereof from which heat may be radiated to the surrounding atmosphere.

Collar portion 6 is subjected to considerable heat from the broiler-griddle combination, or other portion of the stove to which it is connected, but the heat conducted through the collar is largely dissipated through the exposed radiating surfaces thereof, and such heat as is not so dissipated is largely blocked by the fiber insulating washer or gasket 10 before it reaches the outer portion of the handle which is normally grasped in the hand, thereby insuring that the grasping portion of the handle will be cool enough to be manipulated without discomfort. Some heat will be transmitted from the collar to the upper part of the grasping portion of the handle, but this heat will be largely dissipated at this upper part, and the lower part which is actually grasped will be cool enough to be grasped. It is, of course, to be understood that the thickness of gasket 10 is such as to provide the necessary sharp temperature gradient drop between the collar and the grasping portion of the handle.

The handle illustrated in the drawings and described above is designed to conform in shape and appearance to the other handles provided on the stove, but it may be of any desired shape. These other handles may, if desired, have the same construction as the handle described. The advantages inherent in the handle structure of the present invention are not limited to handles used on a stove, but may be utilized in connection with any handle that is subjected to excessive heat.

Although we have described a preferred embodiment of our invention in considerable detail, it will be understood that the description is intended to be illustrative, rather than restrictive, as many details may be modified or changed without departing from the spirit or scope of the invention. Accordingly, we do not desire to be restricted to the exact structure described.

We claim:

An insulated handle comprising a metal collar portion, means for securing said collar portion to the object to be manipulated by said handle, said collar portion having an annular recess in one surface thereof, a metal grasping portion, a non-metallic disk interposed between said collar portion and said grasping portion, said disk being of sufficient thickness to insulate said collar portion from said grasping portion, and a plurality of headed screws extending through a portion of said collar portion and said disk and threaded into said grasping portion, said screws having their heads in engagement with the bottom of the said recess in said collar portion.

JOHN E. CHAMBERS.
THOMAS ESTA PHARES.

REFERENCES CITED

The following references are of record in the file of this patent:

UNITED STATES PATENTS

| Number | Name | Date |
|---|---|---|
| 570,764 | McKeever | Nov. 3, 1896 |
| 597,618 | Roberts | Jan. 18, 1898 |
| 608,740 | Wieder | Aug. 9, 1898 |
| 635,006 | Walsh | Oct. 17, 1899 |